United States Patent
Kurata (10) Patent No.: US 10,221,732 B2
(45) Date of Patent: Mar. 5, 2019

(54) LUBRICATION SYSTEM FOR INTERNAL COMBUSTION ENGINE

(71) Applicant: HONDA MOTOR CO., LTD., Tokyo (JP)

(72) Inventor: Mashu Kurata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 110 days.

(21) Appl. No.: 14/992,158

(22) Filed: Jan. 11, 2016

(65) Prior Publication Data
US 2016/0230622 A1    Aug. 11, 2016

(30) Foreign Application Priority Data
Feb. 9, 2015    (JP) .................... 2015-022877

(51) Int. Cl.
| | |
|---|---|
| *F01M 11/02* | (2006.01) |
| *F01M 1/04* | (2006.01) |
| *F16N 7/34* | (2006.01) |
| *F16N 19/00* | (2006.01) |
| *F01M 1/08* | (2006.01) |
| *F01M 1/14* | (2006.01) |

(52) U.S. Cl.
CPC .............. *F01M 11/02* (2013.01); *F01M 1/04* (2013.01); *F01M 1/08* (2013.01); *F01M 1/14* (2013.01); *F16N 7/34* (2013.01); *F16N 19/00* (2013.01); F01M 2001/083 (2013.01); F01M 2011/022 (2013.01); F16N 2200/08 (2013.01)

(58) Field of Classification Search
CPC ....... F01M 2011/022; F01M 2011/083; F01M 11/02; F01M 2011/023; F01M 1/04; F16N 7/32; F16N 7/34
See application file for complete search history.

(56) References Cited

U.S. PATENT DOCUMENTS

| | | | | |
|---|---|---|---|---|
| 2,680,496 | A * | 6/1954 | Johnson | F16N 7/34 |
| | | | | 184/55.2 |
| 2,682,259 | A * | 6/1954 | Watkins | F01M 3/00 |
| | | | | 123/196 CP |

(Continued)

FOREIGN PATENT DOCUMENTS

JP        2014-20314 A    2/2014

OTHER PUBLICATIONS

Heinz P. Bloch & Abdus Shamim, Oil Mist Lubrication: Practical Applications, 1998, The Fairmont Press, p. 29-34.*

*Primary Examiner* — Hieu T Vo
*Assistant Examiner* — Arnold Castro
(74) *Attorney, Agent, or Firm* — Westerman, Hattori, Daniels & Adrian, LLP (57) ABSTRACT

A lubrication system for an engine is provided which includes an oil tank, a first passage communicating a bottom part of the crankcase chamber with an upper part of the oil tank, a first check valve provided in the first passage to permit a flow from the crankcase chamber to the oil tank but not in a reverse direction, a second passage communicating an upper part of the oil tank with an upper part of the crankcase chamber, a second check valve provided in the second passage to permit a flow from the oil tank to the crankcase chamber but not in a reserve direction and a third passage communicating a lower part of the oil tank with the second passage.

7 Claims, 5 Drawing Sheets

(56) References Cited

U.S. PATENT DOCUMENTS

| | | | | |
|---|---|---|---|---|
| 3,211,255 A * | 10/1965 | Miyazaki | F16N 7/34 | 184/55.2 |
| 3,709,202 A * | 1/1973 | Brown | F02B 1/00 | 123/518 |
| 3,730,149 A * | 5/1973 | Brown | F02B 61/045 | 123/572 |
| 3,929,111 A * | 12/1975 | Turner | F02B 33/04 | 123/73 A |
| 4,383,503 A * | 5/1983 | Griffiths | F02B 33/44 | 123/73 A |
| 4,590,897 A * | 5/1986 | Hundertmark | F02M 33/043 | 123/73 A |
| 4,599,979 A * | 7/1986 | Breckenfeld | F01M 1/04 | 123/196 W |
| 4,820,213 A * | 4/1989 | Holtermann | F02B 61/045 | 123/73 R |
| 4,890,587 A * | 1/1990 | Holtermann | F02B 33/04 | 123/195 HC |
| 5,190,121 A * | 3/1993 | Muzyk | F01M 1/02 | 123/196 R |
| 5,253,733 A * | 10/1993 | Miyachi | F16C 19/388 | 137/561 A |
| 5,379,732 A * | 1/1995 | Mavinahally | F01P 1/04 | 123/73 AA |
| 5,694,891 A * | 12/1997 | Liebich | F02B 33/10 | 123/68 |
| 5,709,185 A * | 1/1998 | Aizawa | F01M 1/04 | 123/196 CP |
| 5,948,968 A * | 9/1999 | Ehlert | F16N 7/32 | 184/6.26 |
| 5,975,042 A * | 11/1999 | Aizawa | F01M 1/04 | 123/196 CP |
| 6,065,445 A * | 5/2000 | Motose | F02B 61/045 | 123/305 |
| 6,148,807 A * | 11/2000 | Hazen | F01M 1/04 | 123/572 |
| 6,606,982 B1 * | 8/2003 | Stockhausen | F01M 13/0011 | 123/572 |
| 6,782,851 B2 * | 8/2004 | Geyer | F02B 33/04 | 123/73 B |
| 6,877,474 B2 * | 4/2005 | Radel | F01M 3/00 | 123/196 M |
| 7,198,020 B1 * | 4/2007 | Beddick | F01M 1/08 | 123/196 R |
| 7,438,064 B2 * | 10/2008 | Borchardt | F01M 3/00 | 123/196 CP |
| 7,574,985 B2 * | 8/2009 | Kirchberger | F02B 25/02 | 123/73 A |
| 7,809,495 B2 * | 10/2010 | Leufen | F02D 41/24 | 700/180 |
| 8,316,980 B2 * | 11/2012 | Hanawa | B60K 6/40 | 180/220 |
| 8,561,581 B2 * | 10/2013 | Taylor | F02B 25/02 | 123/306 |
| 8,978,614 B2 * | 3/2015 | Takahashi | F01M 1/04 | 123/196 CP |
| 9,022,004 B2 * | 5/2015 | Hara | F01M 1/04 | 123/196 R |
| 9,255,535 B2 * | 2/2016 | Larsson | F02D 31/007 | |
| 2004/0168656 A1 * | 9/2004 | Carlsson | F02B 25/22 | 123/73 PP |
| 2005/0061267 A1 * | 3/2005 | Cho | F01M 1/16 | 123/41.35 |
| 2010/0300407 A1 * | 12/2010 | Ravenhill | F02M 35/10032 | 123/468 |
| 2011/0067659 A1 * | 3/2011 | Sugiyama | F01M 1/04 | 123/90.33 |
| 2011/0067669 A1 * | 3/2011 | Sugiyama | F16N 7/32 | 123/196 R |
| 2013/0091816 A1 * | 4/2013 | Yamazaki | F02M 35/1019 | 55/385.1 |
| 2013/0118440 A1 * | 5/2013 | Nakamura | F01M 1/04 | 123/196 CP |
| 2013/0139782 A1 * | 6/2013 | Takahashi | F01M 1/04 | 123/196 R |
| 2014/0026854 A1 * | 1/2014 | Lindstrom | F02M 1/16 | 123/437 |
| 2014/0116391 A1 * | 5/2014 | Foege | F02B 25/04 | 123/470 |
| 2014/0209053 A1 * | 7/2014 | Norrick | F01M 11/061 | 123/196 R |
| 2015/0218979 A1 * | 8/2015 | Cathcart | F01M 1/02 | 123/294 |
| 2015/0260083 A1 * | 9/2015 | Kurata | F02B 25/02 | 123/73 R |
| 2015/0322895 A1 * | 11/2015 | Mavinahally | F01M 1/02 | 123/527 |
| 2016/0138467 A1 * | 5/2016 | Hoshikawa | F02B 75/32 | 123/48 B |

\* cited by examiner

LUBRICATION SYSTEM FOR INTERNAL COMBUSTION ENGINE

TECHNICAL FIELD

The present invention relates to a lubrication system for an internal combustion engine.

BACKGROUND ART

In the field of two stroke engines, it is known to mix lubricating oil in mist form with the intake mixture in order to lubricate various sliding parts of the engine which are exposed to the mixture. Mixing lubricating oil with the fuel may be accomplished by mixing the lubricating oil with the liquid fuel which is then injected into the intake air or by spraying oil mist into the intake air separately from the fuel. For instance, JP2014-20314A discloses an arrangement where lubricating oil stored in an oil tank is fed to and injected into an intake passage by using a diaphragm oil pump.

However, the need for an oil pump for supplying lubricating oil inevitably increases the size and complexity of the engine so that the engine may not be commercially acceptable for use as a general purpose engine. Furthermore, when lubricating oil is injected into an intake passage in mist form, the lubricating oil is deposited on the wall surfaces of the intake passage (including the crankcase chamber and the scavenging passage), and stays thereon. When such deposited lubricating oil is sucked into the combustion chamber in any substantial amount, the resulting combustion of the lubricating oil may cause an increase in THC (total hydrocarbon content) in the emission, generation of white smoke and abnormal combustion. Therefore, when the lubricating oil is mixed with the intake in mist form, it is desirable to recover the lubricating oil deposited on the wall surfaces.

SUMMARY OF THE INVENTION

In view of such problems of the prior art, a primary object of the present invention is to provide a lubrication system for an internal combustion engine which allows the lubricating oil to be supplied to various parts of the engine, and allows the lubricating oil that may be deposited on the wall surfaces of the engine to be recovered by using a simple structure.

Such an object of the present invention can be accomplished by providing a lubrication system (85) for an internal combustion engine (E), wherein a pressure in a crankcase chamber (2A) thereof pulsates owing to a reciprocating movement of a piston (23) in a cylinder (22), the system comprising: an oil tank (55) storing lubricating oil therein; a first passage (66) communicating a vertically lower part of the crankcase chamber with a gas phase part of the oil tank; a first check valve (69) provided in the first passage to permit a flow from the crankcase chamber to the oil tank but not in a reverse direction; a second passage (72) communicating the gas phase part of the oil tank with a vertically upper part of the crankcase chamber; a second check valve (47) provided in the second passage to permit a flow from the oil tank to the crankcase chamber but not in a reserve direction; and a third passage (75) communicating a liquid phase part of the oil tank with the second passage.

Owing to this arrangement, the pressure pulsation of the crankcase chamber allows the lubricating oil trapped in the lower part of the crankcase chamber to be recovered to the oil tank, and the oil stored in the oil tank to be supplied to the crankcase chamber in mist form. When the crankcase chamber is placed under positive pressure which is higher than the pressure in the liquid phase part of the oil tank, the first check valve is opened so that the lubricating oil trapped in the lower part of the crankcase chamber and the gas in the crankcase chamber are forwarded to the oil tank via the first passage. The gas in the gas phase part of the oil tank is pressurized by the pressure in the crankcase chamber to be pumped toward the intake passage via the second passage. At the same time, the lubricating oil in the liquid phase part is placed under pressure from the gas phase part, and is fed to the second passage via the third passage. As the lubricating oil is mixed with the gas under pressure at the connecting part between the second passage and the third passage, the lubricating oil is atomized, and oil mist is produced. As the piston moves upward, and the crankcase chamber is placed under a negative pressure, the second check valve is opened so that the oil mist is fed into the crankcase chamber along with the gas. The engine of the present invention is thus able to recover the lubricating oil from the crankcase chamber, and return the lubricating oil back to the crankcase chamber in mist form by using a simple structure and without requiring a pump.

According to a certain aspect of the present invention, the internal combustion engine consists of a two stroke engine, and is provided with a scavenging passage (50) selectively communicating an intake passage (44) communicating with the crankcase chamber with a side part of the cylinder depending on a position of the piston. Also, the second passage is connected to the crankcase chamber via the intake passage, and the second check valve is provided in the intake chamber instead of the second passage proper.

In this arrangement, the oil mist produced in the connecting part between the second passage and the third passage is passed through the crankcase chamber and the scavenging passage, in that order, before being mixed with the intake flowing into the cylinder so that the lubricating oil is effectively supplied to various sliding parts of the engine. Furthermore, the second check valve performs the additional function of controlling the flow of the intake into the crankcase chamber so that the number of necessary component parts can be reduced.

According to another aspect of the present invention, a flow regulator valve (81) is provided in the third passage to adjust a flow rate of lubricating oil that passes through the third passage.

In this arrangement, the amount of the lubricating oil that is mixed with the gas flowing through the second passage can be adjusted so that the concentration of the oil mist and the size of the oil droplets can be controlled.

According to yet another aspect of the present invention, a third check valve (82) is provided in a part of the second passage located between a connecting part (78) with the third passage and the liquid phase part of the oil tank, the third check valve permitting a flow from the liquid phase part of the oil tank to the connecting part but not in an opposite direction.

In this arrangement, even when the pressure in the intake passage should rise depending on the operating condition of the engine, the lubricating oil is prevented from flowing through the second passage toward the oil tank.

According to yet another aspect of the present invention, the engine consists of a horizontal engine having a cylinder axial line (A) oriented in a substantially horizontal direction.

Thereby, the lubricating oil is favorably put into mist form, and is allowed to reach various sliding parts of the engine carried by the intake so that the lubrication of the sliding parts can be accomplished without regard to the orientation of the engine.

According to yet another aspect of the present invention, a bottom part of the scavenging passage is located higher than a bottom part of the crankcase chamber, and a fourth passage (63) communicates the bottom part of the scavenging passage with the bottom part of the crankcase chamber to conduct liquid under the action of the gravity.

Thereby, the lubricating oil that has deposited on the wall surface of the scavenging passage is expelled to the crankcase chamber via the fourth passage so that the deposited lubricating oil is prevented from being carried into the cylinder.

The present invention may further comprise a fuel injection valve (86) for injecting fuel into the scavenging passage.

Thereby, the distance from the fuel injection valve to the cylinder is minimized so that the adherence of fuel on the structural members of the crankcase chamber such as the wall is minimized. As a result, the mixing of fuel with the lubricating oil trapped in the bottom part of the crankcase chamber is minimized.

According to yet another aspect of the present invention, the lubrication system further comprises a throttle valve (46) in a part of the intake passage upstream of the second check valve, and the second passage is connected to a part of the intake passage located between the throttle valve and the second check valve.

By making use of the intake negative pressure produced downstream of the throttle valve, the lubricating oil in the second passage in mist form can be favorably transported to the intake passage, and the lubricating oil is prevented from adhering to the throttle valve.

According to yet another aspect of the present invention, the second passage is provided with a flow restriction (91, 93), and a corresponding end of the third passage is connected to the second passage at the flow restriction.

Thereby, the flow speed of the gas passing through the flow restriction is increased, and a negative pressure is produced in the flow restriction. Therefore, the lubricating oil is drawn from the third passage to the second passage owing to this negative pressure so that the mixing of the gas and the lubricating oil at the connecting part is enhanced, and the lubricating oil is turned into oil mist in a favorable manner.

Thus, according to the present invention, the lubrication system for an internal combustion engine allows the lubricating oil to be supplied to various parts of the engine, and allows the lubricating oil that may be deposited on the wall surfaces of the engine to be recovered by using a simple structure.

DETAILED DESCRIPTION OF THE PREFERRED EMBODIMENT(S)

The present invention is described in the following in terms of a preferred embodiment consisting of a single cylinder, uni-flow two stroke engine (engine E) with reference to the appended drawings. In the illustrated embodiment, the engine E is used for powering an electric generator.

Figure 1:
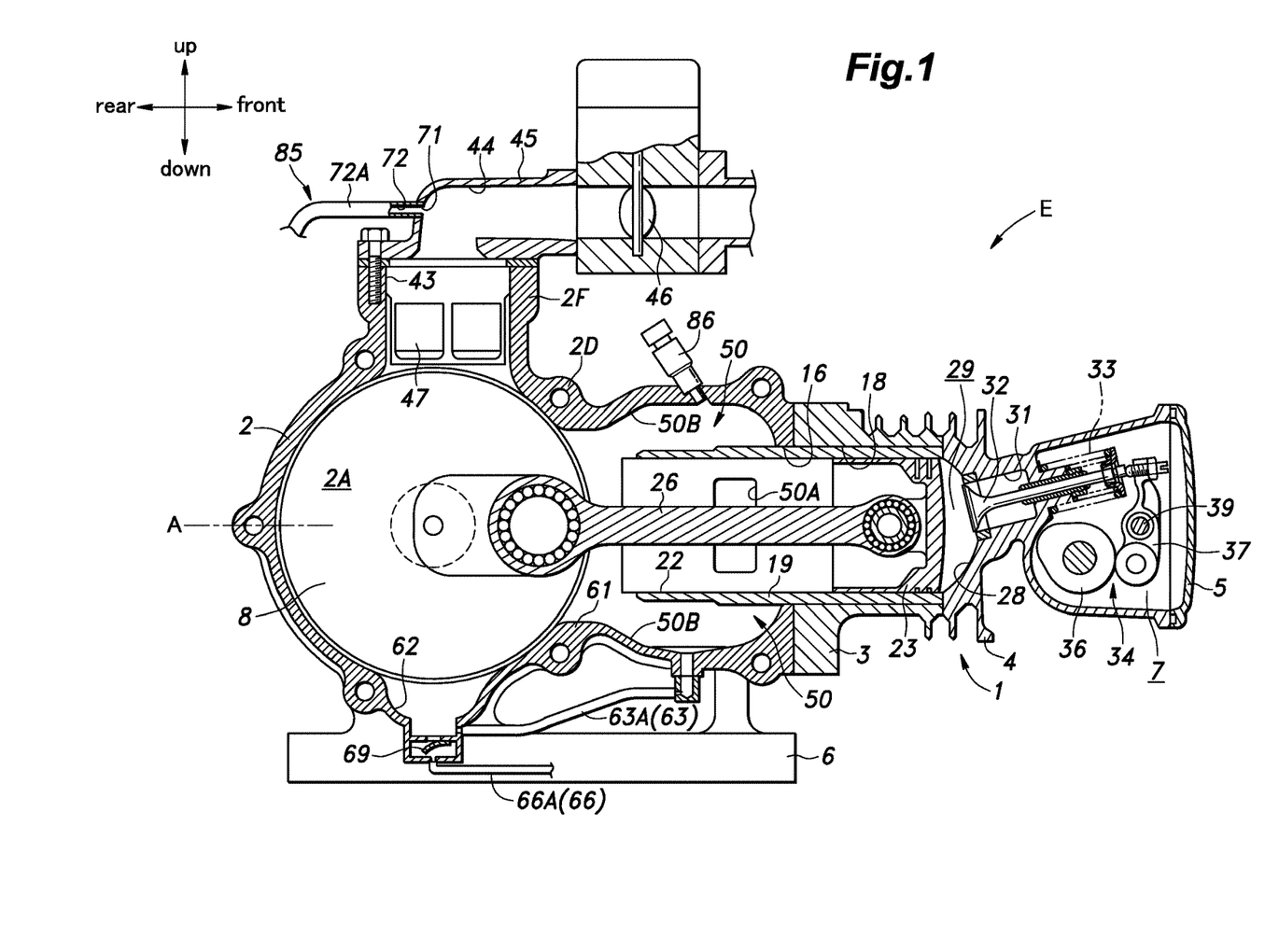
FIG. 1 is a vertical sectional view of a single cylinder, uni-flow two stroke engine embodying the present invention.
Figure 2:
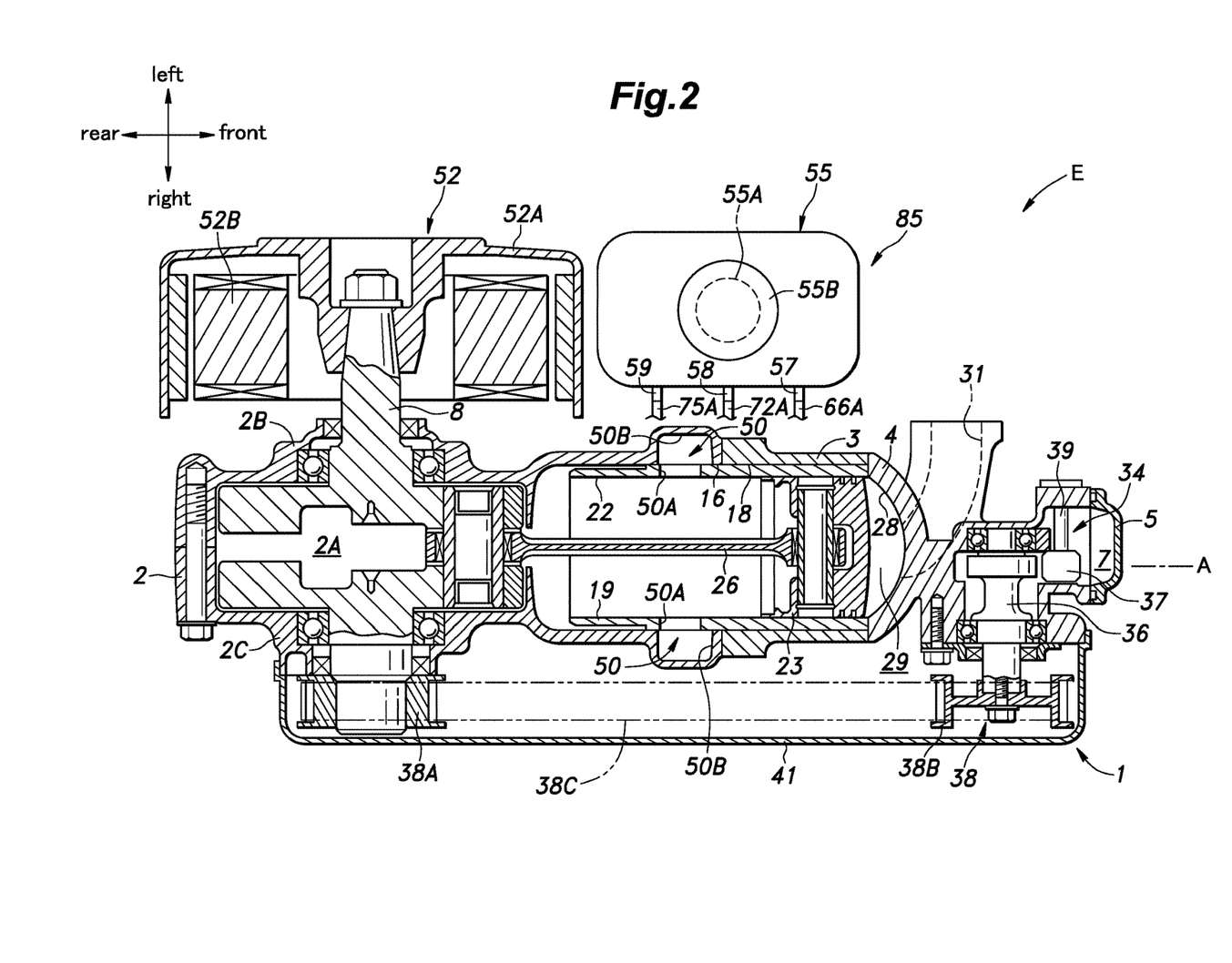
FIG. 2 is a horizontal sectional view taken along line II-II of FIG. 1.

As shown in FIGS. 1 and 2, an engine main body 1 of the engine E includes a crankcase 2 defining a crankcase chamber 2A therein, a cylinder block 3 connected to the front end of the crankcase 2, a cylinder head 4 connected to the front end of the cylinder block 3 and a head cover 5 connected to the front end of the cylinder head 4 and defining a valve actuation chamber 7 in cooperation with the cylinder head 4. The engine main body 1 extends in the fore and aft direction, and is provided with a horizontal cylinder axial line A extending in the fore and aft direction. The lower surface of the crankcase 2 is attached to a base 6 for supporting the engine main body 1 in this horizontal orientation.

The crankcase 2 is formed by a pair of crankcase halves laterally separated from each other by a vertical parting plane (passing through the cylinder axial line A). The crankcase halves are joined to each other by using threaded bolts, and jointly define the crankcase chamber 2A. A crankshaft 8 is rotatably supported by the outer side walls 2B and 2C of the corresponding crankcase halves via corresponding bearings.

The crankshaft 8 is provided with a pair of journals supported by the side walls 2B and 2C of the crankcase 2, a pair of webs provided between the journals and a crankpin supported between the webs in an eccentrically offset position relative to the journals.

The left end of the crankshaft 8 extends through the left side wall 2B of the crankcase 2, and projects leftward. The right end of the crankshaft 8 extends through the right side wall 2C of the crankcase 2, and projects rightward. A seal member is provided in each part of the crankcase 2 through which the crankshaft 8 is passed.

The front end of the crankcase 2 is provided with a fore and aft extension, and the front end of this extension is formed with a sleeve receiving opening 16 consisting of a circular opening.

The cylinder block 3 extends in the fore and aft direction, and is attached to the front end of the crankcase extension. The cylinder block 3 internally defines a cylinder receiving bore 18 extending over the entire length of the cylinder block 3. When the cylinder block 3 is attached to the crankcase 2, the rear opening of the cylinder receiving bore 18 conformally aligns with the sleeve receiving opening 16 of the crankcase 2 so that a continuous bore is defined jointly by the cylinder receiving bore 18 and the sleeve receiving opening 16.

A cylindrical cylinder sleeve 19 is press fitted into the sleeve receiving opening 16 and the cylinder receiving bore 18. The rear end of the cylinder sleeve 19 projects into the crankcase extension, and the front end of the cylinder sleeve 19 is flush with the front surface of the cylinder block 3, and abuts the opposing surface of the cylinder head 4. The inner bore of the cylinder sleeve 19 defines an engine cylinder 22.

The cylinder 22 slidably receives a piston 23 which is pivotally connected to a small end of a connecting rod 26 via a piston pin extending in parallel with the crankshaft 8. The big end of the connecting rod 26 is pivotally connected to the crankpin via a bearing. The piston 23 is thus connected to the crankshaft 8 via the connecting rod 26 such that the reciprocating movement of the piston 23 is converted into the rotational movement of the crankshaft 8.

In the illustrated embodiment, the cylinder 22 is oriented horizontally so that the piston 23 moves forward to reduce the volume of the combustion chamber 29, and downward to increase the volume of the combustion chamber 29. However, for the convenience of illustration, such a forward movement may be referred to as an upward movement or an upward stroke of the piston 23, and a rearward movement as a downward movement or a downward stroke of the piston 23.

As shown in FIGS. 1 and 2, the rear end surface of the cylinder head 4 is formed with a spherical recess 28 at a position corresponding to the cylinder 22. A combustion chamber 29 is defined by the spherical recess 28, the opposing end surface of the piston 23 and the surrounding wall of the cylinder sleeve 19 in a per se known manner.

In the cylinder head 4 is provided an ignition plug (not shown in the drawings) whose plug tip is exposed to the combustion chamber 29. The cylinder head 4 is further provided with an exhaust port 31 opening into the combustion chamber 29 and an exhaust valve 32 consisting of a poppet valve provided in the exhaust port 31. The exhaust valve 32 is provided with a valve stem that extends into the valve actuation chamber 7, and normally closes the exhaust port 31 under the spring force of a valve spring 33. The exhaust valve 32 can be lifted or opened at a prescribed timing in relation with the rotation of the crankshaft 8 via a valve actuation mechanism 34.

As shown in FIG. 1, the valve actuation mechanism 34 includes a camshaft 36 and a rocker arm 37. The camshaft 36 extends in parallel with the crankshaft 8 and is rotatably supported by the cylinder head 4. The right end of the camshaft 36 projects out of the cylinder head 4, and is connected to the crankshaft 8 via a power transmission mechanism 38. The power transmission mechanism 38 includes a crank pulley 38A fitted on the right end of the crankshaft 8, a cam pulley 38B fitted on the right end of the camshaft 36 and a timing belt 38C passed around the crank pulley 38A and the cam pulley 38B. The power transmission mechanism 38 causes the camshaft 36 to rotate at the same speed as and in synchronism with the crankshaft 8.

The part of the cylinder head 4 through which the right end of the camshaft 36 extends is provided with a seal member for maintaining the airtightness of the valve actuation chamber 7 which contains a suitable amount of lubricating oil. The lubricating oil in the valve actuation chamber 7 is stirred by the camshaft 36 so that the sliding parts of the camshaft 36 and the rocker arm 37 are lubricated by the splashed lubricating oil. The head cover 5 may be provided with a filler opening for replenishing the lubricating oil although not shown in the drawings.

The rocker arm 37 is pivotally supported by a rocker shaft 39 supported by the cylinder head 4. The rocker shaft 39 extends in parallel with the camshaft 36. An end of the rocker arm 37 engages the stem end of the exhaust valve 32, and the other end of the rocker arm 37 engages a cam lobe of the camshaft 36 so that the exhaust valve 32 is caused to open the exhaust port 31 at a prescribed timing. The exhaust valve 32 opens once for each revolution of the crankshaft 8.

An end cover 41 is attached to the right side of the crankcase 2, the cylinder block 3 and the cylinder head 4. The end cover 41 is secured to the outer surface of the crankcase 2, the cylinder block 3 and the cylinder head 4 along the peripheral part thereof so as to cover the power transmission mechanism 38.

As shown in FIG. 1, an upper wall 2D of the crankcase 2 is formed with a projection 2F projecting upward. The projection 2F internally defines an intake port 43 which communicates with the crankcase chamber 2A at the lower (downstream) end thereof and with the atmosphere at the upper (upstream) end thereof. The upper end of the intake port 43 is connected to the downstream end of an intake pipe 45 which internally defines an intake passage 44. The intake passage 44 is provided with an air inlet (not shown in the drawings), an air cleaner (not shown in the drawings) and a throttle valve 46 in that order from the inlet end thereof. The intake port 43 is provided with an intake valve (second check valve) 47 that permits the gas flow from the intake passage 44 to the crankcase chamber 2A, but prevents the gas flow from the crankcase chamber 2A to the intake passage 44. In the illustrated embodiment, the intake valve 47 consists of a reed valve including a tent-shaped base with a pointed end directed inward and defining through holes therein and reeds attached to the slanted inner sides of the base so as to close the open ends of the through holes. The intake valve 47 is normally closed, but opens when the pressure in the crankcase chamber 2A becomes lower than the pressure in the intake passage 44 by a prescribed amount owing to the upward movement of the piston 23, and the reeds are deflected away from the open ends of the through holes.

A scavenging passage 50 is defined in the crankcase extension to communicate the crankcase 2A with the interior of the cylinder sleeve 19. The scavenging passage 50 includes a scavenging port 50A formed in the cylinder sleeve 19 and a passage section 50B extending from the scavenging port 50A to the crankcase chamber 2A. The passage section 50B is formed in the part of the crankcase extension surrounding the cylinder sleeve 19 in a front part of the crankcase 2. In the illustrated embodiment, the passage section 50B includes two linear sections extending forward from the crankcase chamber 2A one above the other and an annular section connected between the front ends of the two linear sections. The passage section 50B is connected to the scavenging port 50A via this annular section. In the illustrated embodiment, the scavenging port 50A is provided on either lateral side of the cylinder sleeve 19. The fore and aft dimension of the scavenging port 50A is smaller than the fore and aft dimension of the outer circumferential face of the piston 23.

The scavenging port 50A (scavenging passage 50) is closed and opened as the piston 23 reciprocates. In particular, when the piston 23 is located at a position corresponding to the scavenging port 50A, the scavenging passage 50 is closed by the outer peripheral face of the piston 23. When the lower or rear edge of the piston 23 is located above or ahead (the TDC side) of the lower or rear edge of the scavenging port 50A, the scavenging passage 50 communicates with the space (the crankcase chamber 2A) of the cylinder 22 defined under the piston 23. When the upper edge of the piston 23 is located below (the BDC side) the upper edge of the scavenging port 50A, the scavenging passage 50 communicates with the space (combustion chamber 29) of the cylinder 22 defined above the piston 23.

An AC generator 52 is provided on the left side of the crankcase 2. The left end of the crankshaft 8 is connected to a rotor 52A of the AC generator 52, and a stator 52B is fixedly attached to the crankcase 2 with a suitable fastening arrangement not shown in the drawings. As the crankshaft 8 rotates, the rotor 52A rotates with respect to the stator 52B, and electric power is generated.

An oil tank 55 is provided on the left side of the crankcase 2 and the cylinder block 3 at a position more forward than the AC generator 52. The oil tank 55 stores a prescribed amount of lubricating oil, and the upper part (gas phase part) of the oil tank 55 may contain lubricating oil in mist form. The oil tank 55 has a prescribed vertical dimension, and has a filler opening 55A at a top end of the oil tank 55. The filler opening 55A is normally closed by a cap 55B. A first communication opening 57 and a second communication opening 58 are provided in an upper part of the oil tank 55, and are positioned to be above the level of the lubricating oil stored in the oil tank 55. A third communication opening 59 is provided in a lower part (liquid phase part) of the oil tank 55 which is located below a minimum level line of the lubricating oil so as to be located below the level of the lubricating oil at all times.

A hump 61 or an elevated part is formed in a lower part of the crankcase 2 adjoining the extension so as to face the passage section 50B of the scavenging passage 50. The hump 61 is more elevated than the lowest part of the inner surface of the lower wall of the extension (or the bottom part of the passage section 50B) and the bottom part of the crankcase chamber 2A. The bottom part of the crankcase chamber 2A is provided with an oil collector 62 consisting of a recess defined by a downward bulge of the bottom wall of the crankcase 2. The bottom part of the passage section 50B defines a recessed part which is located vertically above the oil collector 62 of the crankcase 2, and is connected to the oil collector 62 via an oil return passage 63 defined by a separate tube member 63A or, alternatively, by a hole formed in the crankcase 2. The lubricating oil collected in the bottom part of the passage section 50B is conducted to the oil collector 62 in the crankcase chamber 2A under the action of the gravity.

Figure 3:
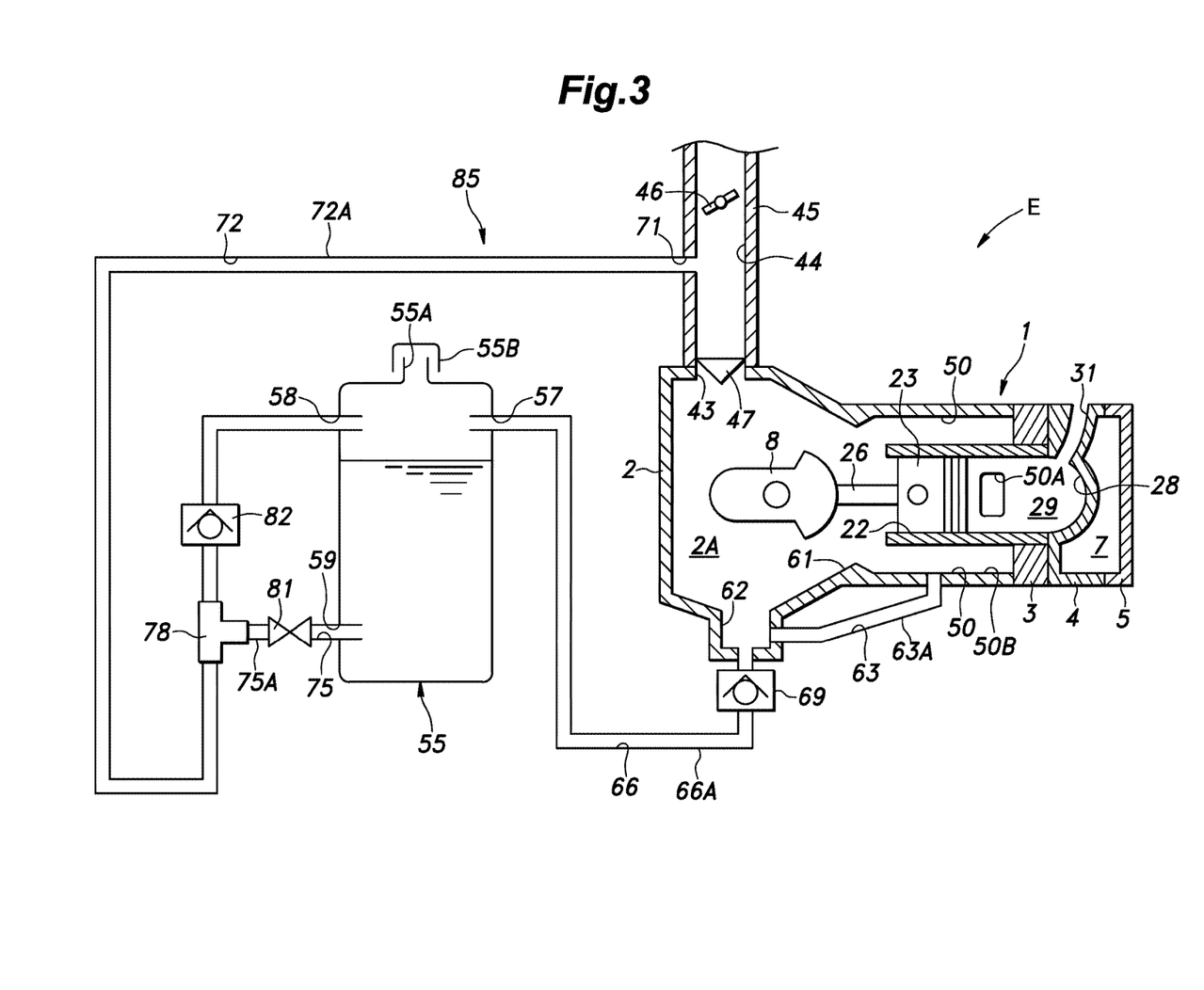
FIG. 3 is a diagram illustrating the structure of the lubrication system.

As shown in FIG. 3, the oil collector 62 in the crankcase chamber 2A communicates with the first communication opening 57 of the oil tank 55 via a first passage 66. The first passage 66 may be defined by a separate tube member 66A or a hole in the crankcase 2. The crankcase side end of the first passage 66 is connected to the lowest point of the oil collector 62.

A first check valve 69 is provided on the first passage 66 to permit the flow from the crankcase chamber 2A to the oil tank 55 and to prevent the flow in the opposite direction. The first check valve 69 is normally closed, but opens when the pressure in the crankcase chamber 2A is higher than the pressure in the gas phase part of the oil tank 55 by a prescribed amount. In the illustrated embodiment, the first check valve 69 consists of a reed valve.

An oil introduction opening 71 is formed in a part of the intake passage 44 downstream of the throttle valve 46 and upstream of the intake valve 47. The oil introduction opening 71 is defined by a passage passed across the thickness of the wall of the intake pipe 45. The oil introduction opening 71 is connected to the second communication opening 58 of the oil tank 55 via a second passage 72 defined by a pipe member 72A. The oil introduction opening 71 may also be defined by a pipe member projecting into a middle part of the intake passage 44. The second passage 72 is in effect connected to the crankcase chamber 2A via a part of the intake passage 44 downstream of the oil introduction opening 71. In other words, the part of the intake passage 44 downstream of the oil introduction opening 71 may be considered as forming a part of the second passage 72.

The third communication opening 59 is connected to an end of a third passage 75 defined by a tube member 75A. The other end of the third passage 75 is connected to a connecting part 78 provided in an intermediate part of the second passage 72. The connecting part 78 may consist of a tee pipe fitting, and connects the third passage 75 to the second passage 72.

An intermediate part of the third passage 75 is provided with a flow regulator valve 81 that can vary the cross sectional area of the flow passage. The flow regulator valve 81 may consist of a per se known throttle valve such as a needle valve. A third check valve 82 is provided in the part of the second passage 72 located between the second communication opening 58 and the connecting part 78. The third check valve 82 may consist of a per se known check valve that permits the flow from the second communication opening 58 to the connecting part 78 but not in the opposite direction.

A lubrication system 85 for the engine E is formed by the oil collector 62, the first check valve 69, the first passage 66, the oil tank 55, the second passage 72 and the third passage 75. Optionally, the lubrication system 85 further includes the third check valve 82 and the flow regulator valve 81.

As shown in FIG. 1, a fuel injection valve 86 is provided in the upper wall 2D of the crankcase 2, and the tip of the fuel injection valve 86 is directed toward the passage section 50B to inject fuel into the passage section 50B (crankcase chamber 2A) at a prescribed timing. Preferably, the fuel injection valve 86 injects fuel to a part adjacent to the scavenging port 50A of the scavenging passage 50.

The mode of operation of this engine E is described in the following. As shown in FIG. 1, as the piston 23 moves upward (in an upward stroke of the piston 23), the scavenging passage 50 is closed by the piston 23. At the same time, owing to the expansion of the gas in the crankcase chamber 2A, the pressure in the crankcase chamber 2A drops. This causes the intake valve 47 to open, and fresh air to be introduced into the crankcase chamber 2A via the intake port 43. In the meantime, the mixture in the part of the cylinder 22 above the piston 23 (combustion chamber 29) is compressed by the piston 23. When the piston 23 reaches a point near the TDC (top dead center), the mixture is ignited either by a spark ignition or a compression ignition, and the combustion of the fuel takes place.

Then, the piston 23 moves downward (in a downward stroke of the piston 23), and the resulting contraction of the crankcase chamber 2A causes an increase in the pressure of the crankcase chamber 2A. As a result, the intake valve 47 is closed, and the gas in the crankcase chamber 2A is compressed. As the piston 23 moves further downward, the exhaust valve 32 actuated by the valve actuation mechanism 34 opens. This causes the expanded exhaust gas (combusted gas) to flow into the exhaust port 31 as a blow down flow.

When the piston 23 moves further back until the upper end of the piston 23 is positioned below the upper edge of the scavenging port 50A (or when the scavenging port 50A is opened by the piston 23), the combustion chamber 29 communicates with the scavenging passage 50. By this time, the combusted gas in the combustion chamber 29 has dropped to a level lower than the pressure in the crankcase chamber 2A so that the gas in the crankcase chamber 2A is introduced into the combustion chamber 29 via the scavenging passage 50. At this time point, the fuel injection valve 86 injects fuel into the gas flowing in the scavenging passage 50.

As the piston 23 moves upward once again, the scavenging passage 50 is closed by the piston 23. As the piston 23 moves further upward, the exhaust port 31 is closed by the exhaust valve 32 so that the further upward movement of the piston 23 causes the mixture in the combustion chamber 29 to be compressed. At the same time, the crankcase chamber 2A is depressurized so that the intake valve 47 is opened, and fresh air is drawn into the crankcase chamber 2A via the intake port 43.

The two stroke operation of the engine E is performed in this manner. In particular, this operation is performed as a uni-flow operation because the flow of the scavenging air and the exhaust gas is conducted along a relatively linear path from the scavenging passage 50 to the exhaust port 31 via the cylinder 22.

The mode of operation of the lubrication system 85 is described in the following with reference to FIG. 3. When the engine is stationary, the lubricating oil is mainly stored in the oil tank 55 while a small portion of the lubricating oil remains in the oil collector 62, the first passage 66, the second passage 72 and the third passage 75. When the engine is in operation, and the piston 23 reciprocates, a pressure pulsation occurs in the crankcase chamber 2A. This pressure pulsation is used by the lubrication system 85 as a power source in recovering the lubricating oil trapped in the oil collector 62, and supply the lubricating oil in the form of oil mist to the intake passage 44.

During the downward stroke of the piston 23, the volume of the crankcase chamber 2A is reduce so that the pressure in the crankcase chamber 2A rises, and becomes higher than the pressure in the gas phase part of the oil tank 55 and the pressure in the intake passage 44. As a result, the first check valve 69 is opened, and the intake valve 47 is closed.

Opening of the first check valve 69 causes the lubricating oil trapped in the oil collector 62 of the crankcase chamber 2A and the gas within the crankcase chamber 2A to be pumped to the gas phase part of the oil tank 55. The gas in the crankcase chamber contains lubricating oil and fuel in mist form. The lubricating oil and the gas that are introduced into the gas phase part of the oil tank 55 are partly turned into lubricating oil in liquid form under the action of the gravity, and the liquid lubricating oil is fed into the lower liquid phase part of the oil tank 55.

Opening of the first check valve 69 causes the positive pressure of the crankcase chamber 2A to be transmitted to the gas phase part of the oil tank 55 so that the pressure in the gas phase part of the oil tank 55 becomes higher than the pressure in the intake passage 44. As a result, the gas in the gas phase part of the oil tank 55 is supplied to the intake passage 44 via the second passage 72. At this time, the lubricating oil in the liquid phase part of the oil tank 55 is forwarded to the connecting part 78 via the third passage 75 under the pressure of the gas phase part. At the connecting part 78, the gas flowing through the second passage 72 and the liquid lubricating oil flowing through the third passage 75 are mixed with each other so as to produce oil mist.

The oil mist produced at the connecting part 78 is conducted to the intake passage 44 owing to the pressure difference between the gas phase part of the oil tank 55 and the intake passage 44, and is mixed with the intake flowing through the intake passage 44. The intake containing the oil mist is then introduced into the crankcase chamber 2A as the piston 23 moves upward, and the intake valve 47 is opened, and the introduced lubricating oil is used for lubricating the sliding parts of the crankshaft 8, the connecting rod 26, the piston 23 and the cylinder 22. A part of the oil mist contained in the intake is deposited in the sliding parts, and on the wall surfaces of the crankcase 2, the scavenging passage 50 and other engine components, and the remaining part of the lubricating oil is introduced into the combustion chamber 29 along with the intake. The lubricating oil that has deposited in the sliding parts and on the wall surfaces of the crankcase 2 and other engine component parts eventually flows to the oil collector 62. The lubricating oil deposited on the inner wall of the scavenging passage 50 is conducted downward to a lower part of the scavenging passage 50 under the action of the gravity, and flows to the oil collector 62 via the oil return passage 63.

The effect of the engine E of the illustrated embodiment is discussed in the following. The lubrication system 85 of the engine E recovers the lubricating oil trapped in the oil collector 62 formed in a lower part of the crankcase chamber 2A to the oil tank 55, and supplies the lubricating oil stored in the oil tank 55 to the intake passage 44 in mist form by making use of the pressure pulsation in the crankcase chamber 2A. When the crankcase chamber 2A is placed under a positive pressure, and the pressure in the crankcase chamber 2A has become higher than the gas phase part of the oil tank 55 owing to the downward stroke of the piston 23, the first check valve 69 is opened, and the lubricating oil trapped in the oil collector 62 and the gas in the crankcase chamber 2A are forwarded to the oil tank 55 via the first passage 66. The gas in the gas phase part of the oil tank 55 is pumped to the intake passage 44 via the second passage 72 under the positive pressure of the crankcase chamber 2A. At the same time, the lubricating oil in the liquid phase part of the oil tank 55 is passed to the third passage 75, and then to the connecting part 78 connected to the second passage 72 under the pressure of the gas phase part of the oil tank 55. At the connecting part 78, the lubricating oil is put into mist form owing to the mixing of the lubricating oil with the gas. The lubricating oil in mist form is then fed into the intake passage 44 to be mixed with the intake. Thus, according to the engine of the present invention, the lubricating oil can be transported without requiring a pump and by using a simple structure, and the lubricating oil can be mixed into the intake in mist form. By supplying the lubricating oil in liquid form from the third passage 75 to the gas flowing through the second passage 72, the gas and the lubricating oil are mixed with each other so as to form oil mist. Therefore, oil mist can be produced without requiring a mist generator such as an oil slinger that consumes power so that the fuel economy can be improved.

The amount of lubricating oil that is supplied to the connecting part 78 via the third passage 75 can be adjusted by using the flow regulator valve 81. Therefore, by adjusting the flow regulator valve 81, the concentration of lubricating oil in the oil mist and the diameter of the oil droplets in the oil mist can be controlled.

Because the second passage 72 is provided with the third check valve 82, even when the pressure in the intake passage 44 should rise depending on the operating condition of the engine E, the lubricating oil is prevented from flowing back to the second passage 72 (or toward the oil tank 55).

In the illustrated embodiment, because the lubricating oil is put into the form of mist, the lubricating oil is retained in the intake to be distributed to various sliding parts of the engine, and is therefore allowed to reach the respective sliding parts without regard to the orientation of the engine E. For instance, even when the engine E is horizontally placed (with a horizontal cylinder axial line) as is the case with the illustrated embodiment, various sliding parts can be favorably lubricated.

Because the lower part of the scavenging passage 50 is connected to the oil collector 62 via the oil return passage 63, the lubricating oil that is deposited on the wall surface of the scavenging passage 50 can be favorably expelled to the oil collector 62. For this reason, the scavenging passage 50 is relatively free from lubricating oil in liquid form so that the possibility of lubricating oil in liquid form being drawn into the combustion chamber 29 can be minimized.

Because the fuel injection valve 86 injects fuel into the scavenging passage 50, the distance between the fuel injection valve 86 and the scavenging port 50A is minimized, and this minimizes the adhering of fuel on the structural members defining the crankcase chamber 2A such as the wall surface. This contributes to the minimization of the amount of fuel that may mix into the lubricating oil that is collected in the oil collector 62.

The connecting part (or the oil introduction opening 71) between the second passage 72 and the intake passage 44 is provided downstream of the throttle valve 46 and upstream of the intake valve 47 so that the lubricating oil in mist form in the second passage 72 can be transported to the intake passage side by making use of the intake negative pressure produced in the downstream side of the throttle valve 46. Also, this arrangement contributes to the minimization of the adherence of lubricating oil supplied from the second passage 72 onto the throttle valve 46.

Figure 4:
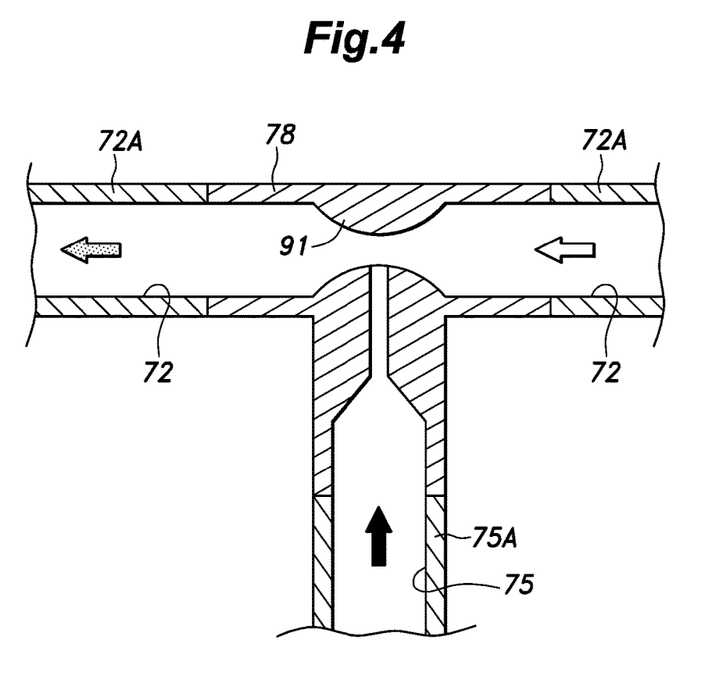
FIG. 4 is a simplified sectional view showing the connecting part between the second passage and the third passage in a first modified embodiment of the present invention.

The present invention has been described in terms of a concrete embodiment, but the present invention is not limited by this embodiment, and can be modified in various ways without departing from the spirit of the present invention. For instance, as shown in FIG. 4, the connecting part 78 may be provided with a flow restriction 91 which narrows the cross sectional area of the second passage 72, and the corresponding end of the third passage 75 may be connected to the second passage 72 at this flow restriction 91. In this case, the flow speed of the gas flowing through the flow restriction 91 increases, and the negative pressure produced at the flow restriction 91 draws the lubricating oil from the side of the third passage 75 so that the mixing of the gas with the lubricating oil is enhanced.

Figure 5:
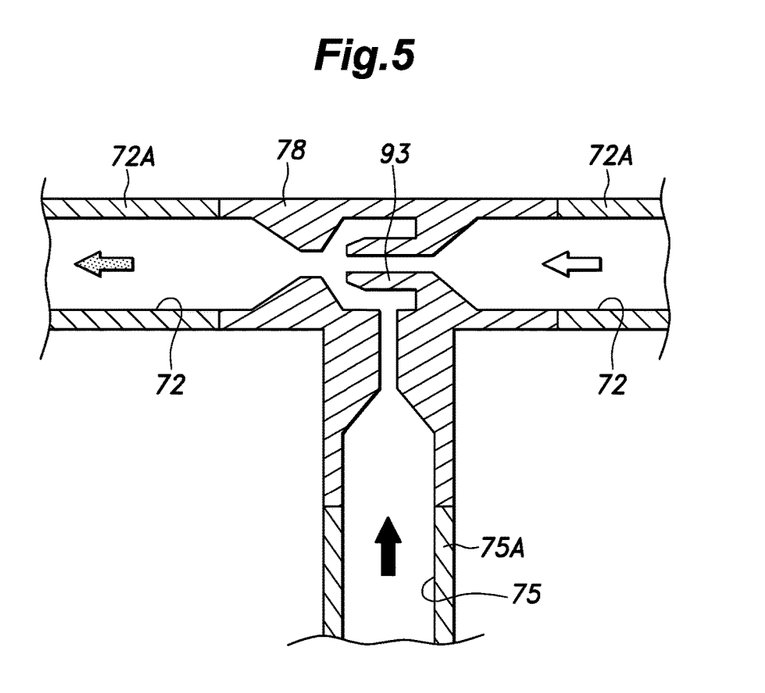
FIG. 5 is a view similar to FIG. 4 showing a second modified embodiment of the present invention.

Also, the connecting part 78 may be formed as an ejector. In this case, as shown in FIG. 5, the connecting part 78 is provided with a nozzle 93 that restricts the cross section of the second passage 72 while the corresponding end of the third passage 75 opens out near the outlet end of the nozzle 93. According to this arrangement, the flow speed of the gas flowing through the nozzle 93 increases, and the negative pressure produced near the outlet end of the nozzle draws the lubricating oil from the side of the third passage 75 so that the mixing of the gas with the lubricating oil is enhanced.

In the illustrated embodiment, the hump 61 was provided between the lower surface of the crankcase chamber 2A and the lower surface of the passage section 50B of the scavenging passage 50. In an alternate embodiment, the lower surface of the passage section 50B is defined by a sloping surface that drops in the rearward direction, instead of providing a hump. According to this arrangement, the liquid lubricating oil that may be deposited on the lower surface of the passage section 50B is caused to flow along the sloping surface rearward under the action of the gravity, and is then collected in the oil collector 62. In this case, the oil return passage 63 may be omitted.

The foregoing embodiment consisted of a two-stroke engine in which the intake is passed through the crankcase chamber 2A, but the present invention is also applicable to other two stroke engines and four stroke engines where the intake is directly supplied to the combustion chamber 29 without passing through the crankcase chamber 2A. The present invention is suited to be applied to engines where a relatively large pressure pulsation occurs in the crankcase chamber 2A, such as single cylinder engines and two cylinder engines with a crankpin phase difference of 360 degrees or 270 degrees. When the intake passage 44 is omitted, the second passage 72 is directly connected to the crankcase chamber 2A, and is provided with a check valve that permits the flow from the oil tank 55 to the crankcase chamber 2A but not in the opposite direction.

The invention claimed is:

1. A lubrication system for a two-stroke internal combustion engine, wherein a pressure in a crankcase chamber thereof pulsates owing to a reciprocating movement of a piston in a cylinder, the system comprising:
   an oil tank storing lubricating oil therein;
   a first passage communicating a vertically lower part of the crankcase chamber with a gas phase part of the oil tank;
   a first check valve provided in the first passage to permit a flow from the crankcase chamber to the oil tank but not in a reverse direction;
   an intake passage communicating with the crankcase chamber via a second check valve that permits a flow from the intake passage to the crankcase chamber but not in a reverse direction;
   a second passage communicating the gas phase part of the oil tank with a part of the intake passage upstream of the second check valve,
   a third passage communicating a liquid phase part of the oil tank with the second passage; and
   a flow regulator valve provided in the third passage to adjust a flow rate of lubricating oil that passes through the third passage,
   wherein the second passage is provided with a flow restriction, and a corresponding end of the third passage is connected to the second passage at the flow restriction so that a negative pressure produced at the flow restriction draws the lubricating oil from the third passage and an oil mist is formed; and
   wherein the flow regulator valve is configured to adjust the amount of the lubricating oil that is supplied to a connecting part of the third passage and the second passage to control the concentration of the lubricating oil in the oil mist and the diameter of the oil droplets in the oil mist.

2. The lubrication system for a two-stroke internal combustion engine according to claim 1, further comprising:
   a scavenging passage selectively communicating the intake passage with a side part of the cylinder depending on a position of the piston.

3. The lubrication system for a two-stroke internal combustion engine according to claim 2, further comprising a throttle valve in a part of the intake passage upstream of the second check valve, wherein the second passage is connected to a part of the intake passage located between the throttle valve and the second check valve.

4. The lubrication system for a two-stroke internal combustion engine according to claim 1, wherein a third check valve is provided in a part of the second passage located between a connecting part with the third passage and the liquid phase part of the oil tank, the third check valve permitting a flow from the liquid phase part of the oil tank to the connecting part but not in an opposite direction.

5. The lubrication system for a two-stroke internal combustion engine according to claim 2,
   wherein the engine consists of a horizontal engine having a cylinder axial line oriented in a substantially horizontal direction; and wherein the bottom part of the crankcase chamber is provided with an oil collector consisting of a recess defined by a downward bulge of the bottom wall of the crankcase.

6. The lubrication system for a two-stroke internal combustion engine according to claim 5, wherein a bottom part of the scavenging passage is located higher than the oil collector, and a fourth passage communicates the bottom part of the scavenging passage with the oil collector to conduct liquid under the action of the gravity.

7. The lubrication system for a two-stroke internal combustion engine according to claim 2, further comprising a fuel injection valve for injecting fuel into the scavenging passage.

* * * * *